April 26, 1932.   A. C. SCHICKLER   1,855,993

CONTROL FOR REFRIGERATING SYSTEMS

Filed Feb. 1, 1930

INVENTOR
Albert C. Schickler

BY
Brockett, Hyde, Higley & Meyer
ATTORNEYS

Patented Apr. 26, 1932

1,855,993

UNITED STATES PATENT OFFICE

ALBERT C. SCHICKLER, OF CLEVELAND, OHIO, ASSIGNOR TO EDMUND E. ALLYNE, OF CLEVELAND HEIGHTS, OHIO

CONTROL FOR REFRIGERATING SYSTEMS

Application filed February 1, 1930. Serial No. 425,191.

This invention relates to the control of absorption type refrigerating systems, its object being to provide a control system which automatically takes care of application of the heat and recurrence of heating and refrigerating phases of the cycle.

More specifically, the object of the invention is to provide a control system in which the rate of application of heat to the boiler is governed according to the condensing effect in a manner to restrain or prevent excessive pressures or violence and avoid surges and the unnecessary transfer of absorbing agent from the boiler to other parts of the apparatus, such as to the evaporator.

A further object of the invention is to provide a control system in which, when the heating phase of the cycle is initiated, it is carried to completion to thereby collect in the vaporator all useful refrigerating agent, but nevertheless with the heating process restrained or governed as aforesaid to prevent unnecessary violence.

A further object of the invention is to provide a system of this kind in which properly governed heating operations may be initiated by time control at regularly recurring intervals and conducted to completion most efficiently.

A further object of the invention is to control or govern the heating operation in a manner to terminate the same according to the temperature of the boiler and to restrain undue violence by limiting rectifier or condenser temperature to a predetermined value.

Further objects are in part obvious and in part will appear more in detail hereinafter.

Figure 1:
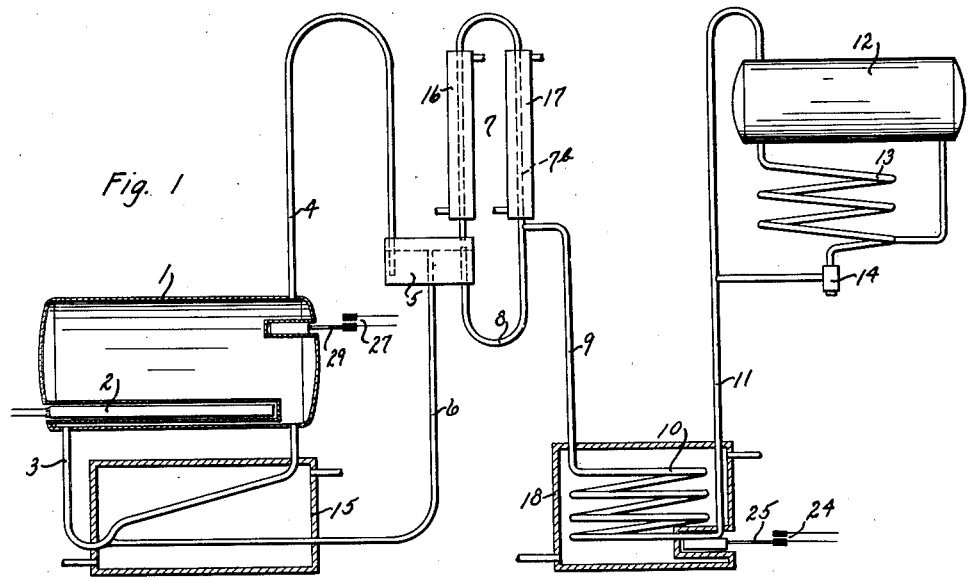
Figure 2:
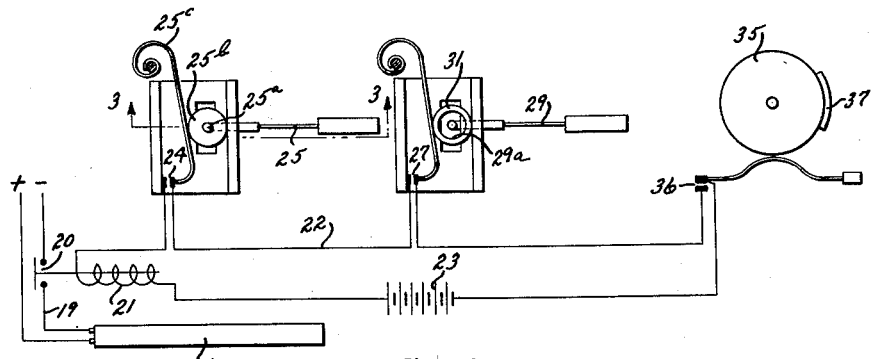
Figure 4:
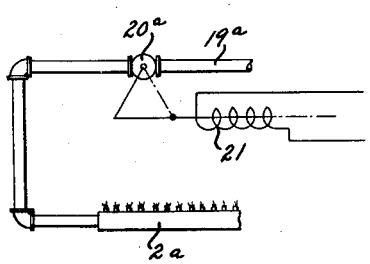
Figure 3:
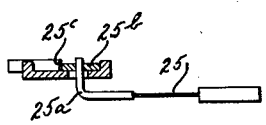

In the drawings, Fig. 1 represents more or less diagrammatically one form of refrigerating apparatus embodying the invention; Fig. 2 is a diagrammatic view illustrating the control circuits; Fig. 3 is a detail cross section on the line 3—3, Fig. 2; and Fig. 4 is a detail view illustrating the control system for a gas heater.

The invention may be applied to various types of refrigerating apparatus, but is especially suitable in connection with an intermittent absorption type refrigerating system. For convenience and not in any sense of limitation, the drawings illustrate a refrigerating system of the general type, including a still-absorber, trap, condenser and evaporator connected in operative reciprocating cycle, described in an application of Albert C. Schickler for refrigerating apparatus, filed June 30, 1927, Serial No. 202,726, to which reference may be had for a more complete description, if necessary or desirable. Generally speaking, the invention is an improvement upon that described and claimed in a co-pending application of Edward Gruber for control for refrigerating systems, filed of even date herewith, Ser. No. 425,200.

Briefly described, the present system includes a boiler 1 provided with a suitable heater 2 and a return circulating loop 3. The refrigerating agent and absorbing agent may be of any suitable character,—for example, ammonia and water. Gas distilled from the boiler passes off through a rising loop 4 and enters the trap 5 beneath the surface of the liquid therein. Gas returning from the evaporator to the boiler reaches this trap and passes to the boiler by way of a pipe 6 opening in the trap at the level of liquid therein and communicating with the circulating loop 3. During the boiling operation, gas delivered from the boiler to the trap by pipe 4 bubbles out through the liquid and then passes to and through a rectifier 7, either or both of the up and down legs of which may be cooled, and the down leg 7b of which is provided with a bottom loop 8 entering the trap 5 above the level of liquid therein. The function of this loop 8 is to collect any liquid such as the absorbing agent, which reaches the rectifier and returns the same to the trap 5. The refrigerating agent in gaseous form leaves the rectifier by way of a pipe 9, passing to the condenser coils 10 and thence by way of pipe 11 to the top of the evaporator 12, which is provided with refrigerating coils 13 and a trap 14 for maintaining a proper charge of refrigerating agent in the evaporator, by permitting undesirable absorbing agent or boiler liquor to return to the boiler by way of pipe 11, condenser 10, etc. This apparatus operates in the usual manner, the boiling operation driving off the refrigerant in the form of gas, rectifying it at the rectifier 7 and returning undesirable liquid to the boiler, the gas being condensed at the condenser and delivered to the evaporator where it is held in storage and utilized during the refrigerating operation, the cycle of alternate boiling and refrigerating steps being recurrent and intermittent. The loop 3, condenser coils 10 and the rectifier 7 may be cooled in any suitable manner, such as by impounded water or other cooling liquid, or by circulating air or the like, and the drawings conventionally illustrate for this purpose the several cooling tanks 15, 16, 17, and 18 containing impounded water or through which water may be circulated, as will be readily understood.

The heater 2 may be of any suitable character and in the drawings is shown as an electric resistance element in a circuit 19 connected to a suitable source of current. However, as shown in Fig. 4, the heater 2a may be a gas heater communicating with a gas supply pipe 19a. In either case the control system includes the necessary devices for controlling the supply of current through the lead wires 19 to the electric heater 2, or of gas or other fuel through the pipe 19a to the heater 2a. As shown, this is usually accomplished by a relay system designed to actuate, operate or control a switch 20 in the electric system or a valve 20a in the gas system, as the case may be. In the electric heating system the switch 20 is intermittently opened and closed by energization or deenergization of a coil 21 in a control circuit 22 connected to a suitable source of current 23. The circuit 22 includes or has associated therewith all necessary devices for regulating or controlling the cycle.

In the first place, this system operates by periodic initiation of the heating phase of the cycle in any suitable manner, either manually or by a device controlled according to the time element or otherwise. When the heating phase is initiated the circuit 22 becomes closed, coil 21 is energized and the heat governing device, such as the switch 20, is closed. The control circuit includes a device sensitive to some condition in the system, which varies continuously throughout the heating phase and ultimately, when the boiling operation is concluded, reaches a maximum the occurrence of which maximum condition is taken advantage of to terminate the heating phase. Such a condition for example, may be the rise of temperature of the boiler, because during the heating operation, as the gas leaves the boiler, the boiler temperature gradually and continually rises, usually reaching a value, for example, of say 320° to 340° F. when the boiling operation is concluded. However, if the rate of supply of heat to the boiler is ungoverned and the heater is of large heating capacity, the boiling operation may and frequently does become quite violent so that boiling, foaming and surging occur, carrying over to the condenser and even to the evaporator unnecessary quantities of undesirable boiler liquor which ought to remain in the boiler. I therefore include in the control system some device designed to prevent too rapid application of heat to the boiler, it being understood that the heater should be designed with the ability to supply sufficient heat at all times. This governing device, in the arrangement shown, is made sensitive to some condition which should not be exceeded if the rate of application of the heat is maintained at the desirable value. For example, this condition may be the temperature of either the rectifier or the condenser, the temperature of the condenser usually being a little lower than that of the rectifier.

In the arrangement shown in the drawings, the control circuit 22 includes a switch 24 controlled or actuated according to the temperature of the rectifier or condenser, such as by operation of said switch by a flexing bimetallic strip 25 or like device located in heat sensitive relation to either the rectifier or condenser, as desired. The switch and its actuating means may be of any desired form, the drawings showing the strip 25 provided with an extension having an arm 25a loosely entering and operating a disc or washer 25b which operates a leaf spring 25c carrying one of the contacts 24. The control circuit also includes a switch 27, which is actuated, in the form shown, by a device sensitive to boiler temperature. This device, shown conventionally in Fig. 1, and in detail in Fig. 2, includes a bimetallic member 29, flexing back and forth by variations in boiler temperature, the operating free end thereof having lost motion as at 29a in a recess in a disc or washer 31 designed to actuate the spring opened switch 27. The control circuit also includes, in the form shown, means for initiating the heating cycle by the time element, to wit, any suitable clock or time mechanism, including a twenty-four hour wheel 35 provided with a cam segment 37 of suitable length, say three or four hours long, cooperating with the movable contact of the spring opened switch 36.

The operation is as follows:

The several switches 24, 27 and 36 are in series through the current source 23 with the relay or operating coil 21. Therefore, coincident closing of all of said switches is necessary to produce a heating effect at the boiler.

During the refrigerating phase of the cycle, the clock switch 36 may be assumed to be open. It is open for twenty hours if the segment 37 is four hours long. The temperature at the condenser is low and the bimetallic strip 25 is flexed downwardly in Fig. 2, so that switch 24 is closed. The temperature at the boiler is also low, so that the bimetallic member 29 is flexed downwardly in Fig. 2 and the switch 27 therefore is closed.

In due course, once in every twenty-four hours, in the arrangement shown, the clock switch 36 closes and remains closed for the length of time of its segment 37, say four hours. The immediate effect of closing this switch is to complete the control circuit 22, energize coil 21 and start the heater. Boiler temperature immediately begins to rise, with consequent distillation of the refrigerant as a gas, accompanied by its rectification, condensation and collection at the evaporator or its storage. As the heating operation continues the temperature at the condenser or rectifier rises to the value predetermined by the proper setting of the flexible strip 25, which of course is either initially formed or is made adjustable to secure the desired predetermined value. This temperature, for example, may be chosen at say 130° F. When this temperature is reached the strip 25 flexes upwardly in Fig. 2 and immediately opens switch 24, turning off the heater. However, distillation continues as a result of the B. t. u.'s contained in the metal of the boiler and the liquid therein, but the condenser and rectifier temperatures begin to drop slightly and with the proper setting of the flexing strip 25 a drop of, say, two or three degrees, to say 127° F., again closes switch 24 and turns on the heater. In this manner the heating operation goes on intermittently, switch 24 being alternately opened and closed so as to maintain condenser or rectifier temperature within a limited range of say between 127° F. and 130° F., thus governing the rate of application of heat to the boiler and preventing undue violence and safeguarding the system against dangerous rise of temperature or pressure. In the meantime, the boiler temperature is gradually rising until finally, when sufficient refrigerant has been distilled and collected in the evaporator, the boiler temperature may rise to, say, 320° to 340°, causing the flexing arm 29 to rise in Fig. 2 and first take up the lost motion in recess 29a and finally move member 31 upwardly until the switch 27 opens. When this occurs, the next closing operation of switch 24 does not turn on the heat, but the heater remains off and all temperatures continue to fall. However, fall in temperature of the boiler flexes the arm 29 downwardly and the lost motion recess 29a in member 31 is made of such diameter that it may take an appreciable period, say one or two hours, for the flexing arm 29 to take up the lost motion and move member 31 downwardly to again close switch 27.

The apparatus is so designed that, assuming a clock segment 37 of four hours in length, the intermittent opening and closing of switch 24 will occur through a period of say three hours before the boiler temperature switch 27 opens, and it will then require two hours to again close the temperature switch 27. By the time said switch is closed, the clock switch 36 is open and will remain open for the next nineteen hours.

As a result of the foregoing, a boiling operation is initiated once in each twenty-four hours, the heating operation continuing with proper governance or control to avoid undue violence and in accordance with variations in temperature of the rectifier or condenser, and the heating operation is finally terminated by the rise in boiler temperature.

What I claim is:

1. Intermittent absorption type refrigerating apparatus, comprising a boiler and an evaporator, a heater for the boiler, means sensitive to a variable boiler condition for terminating the heating operation, and means controlled in accordance with a condition depending upon condensation for controlling the rate of application of the heat to the boiler.

2. Intermittent absorption type refrigerating apparatus, comprising connected boiler and absorber members, a heater for the boiler, means for terminating the heating operation, and means sensitive to temperature variations in the boiler and elsewhere in the apparatus for controlling said heater in a manner to govern the rate of application of the heat to the boiler.

3. Intermittent absorption type refrigerating apparatus, comprising connected boiler, condenser and absorber members, a heater for the boiler, means for initiating the heating operation, means controlled in accordance with a boiler condition for terminating the heating operation, and means governed by the temperature of the condensing operation for controlling said heater in a manner to govern the rate of application of the heat to the boiler.

4. Intermittent absorption type refrigerating apparatus, comprising connected boiler, condenser and absorber members, a heater for the boiler, time control means for initiating the heating operation, and thermostatic means governed in accordance with variations in a condenser condition and effective upon said heater for controlling the rate of application of the heat to the boiler.

5. Intermittent absorption type refrigerating apparatus, comprising connected boiler, condenser and absorber members, a heater for the boiler, and an electric circuit for controlling operation of said heater, said circuit including two switches, time controlled means for one of said switches, and means governed in accordance with variations in a condenser condition for actuating the other switch to govern the rate of application of heat to the boiler.

6. Apparatus of the character described in claim 5, in which said control circuit includes a third switch subject to a boiler condition for terminating the heating operation.

In testimony whereof I hereby affix my signature.

ALBERT C. SCHICKLER.